United States Patent
Vlot et al.

(10) Patent No.: US 8,721,809 B2
(45) Date of Patent: May 13, 2014

(54) METHOD OF THERMOMECHANICAL SHAPING A FINAL PRODUCT WITH VERY HIGH STRENGTH AND A PRODUCT PRODUCED THEREBY

(75) Inventors: Margot Julia Vlot, Leiden (NL); Ronald Theodoor Van Tol, Gravenzande (NL)

(73) Assignee: Tata Steel Ijmuiden B.V., Ijmuiden (NL)

( * ) Notice: Subject to any disclaimer, the term of this patent is extended or adjusted under 35 U.S.C. 154(b) by 552 days.

(21) Appl. No.: 12/525,136

(22) PCT Filed: Feb. 22, 2008

(86) PCT No.: PCT/EP2008/052213
§ 371 (c)(1),
(2), (4) Date: Sep. 24, 2009

(87) PCT Pub. No.: WO2008/102012
PCT Pub. Date: Aug. 28, 2008

(65) Prior Publication Data
US 2010/0026048 A1   Feb. 4, 2010

(30) Foreign Application Priority Data

Feb. 23, 2007 (EP) .................................... 07003812
Mar. 2, 2007 (EP) .................................... 07004332

(51) Int. Cl.
*C23C 2/06* (2006.01)
*C21D 7/10* (2006.01)
*B32B 15/01* (2006.01)
*B32B 15/18* (2006.01)

(52) U.S. Cl.
USPC ......................................... 148/533; 428/659

(58) Field of Classification Search
USPC ......................................... 148/533; 428/659
See application file for complete search history.

(56) References Cited

U.S. PATENT DOCUMENTS

| | | | |
|---|---|---|---|
| 4,239,483 A | 12/1980 | Iida et al. | |
| 4,440,583 A | 4/1984 | Ikegami et al. | |
| 4,985,090 A | 1/1991 | Van Perlstein et al. | |
| 5,472,528 A | 12/1995 | Boyer | |
| 5,512,110 A | 4/1996 | Yoshitomi et al. | |
| 6,296,805 B1 | 10/2001 | Laurent et al. | |
| 2001/0042393 A1 | 11/2001 | Kefferstein et al. | |
| 2004/0050464 A1 | 3/2004 | Engl et al. | |
| 2004/0163439 A1 | 8/2004 | Arns et al. | |
| 2004/0197598 A1 | 10/2004 | Imai et al. | |
| 2004/0255633 A1 | 12/2004 | Hauger | |
| 2006/0130940 A1 | 6/2006 | Kollaritsch et al. | |
| 2006/0134452 A1 | 6/2006 | Suzaki et al. | |
| 2007/0000117 A1 | 1/2007 | Brandstatter et al. | |
| 2007/0035118 A1 | 2/2007 | Ni et al. | |
| 2007/0256808 A1 | 11/2007 | Fleischanderl et al. | |
| 2007/0271978 A1 | 11/2007 | Brandstatter et al. | |
| 2008/0196800 A1 | 8/2008 | Beenken et al. | |
| 2008/0283154 A1 | 11/2008 | Taniguchi et al. | |
| 2008/0308194 A1 | 12/2008 | Corquillet et al. | |
| 2009/0025836 A1 | 1/2009 | Bello et al. | |
| 2010/0258216 A1 | 10/2010 | Wu et al. | |
| 2010/0282373 A1 | 11/2010 | Van Tol et al. | |
| 2010/0304174 A1 | 12/2010 | Wu et al. | |
| 2011/0132052 A1 | 6/2011 | Faderl | |

FOREIGN PATENT DOCUMENTS

| | | |
|---|---|---|
| EP | 0086265 A1 | 8/1983 |
| EP | 0329220 A1 | 8/1989 |
| EP | 1013785 A1 | 6/2000 |
| EP | 1571229 A1 | 9/2005 |
| EP | 1621645 A | 2/2006 |
| EP | 1767659 A1 | 3/2007 |
| EP | 1989638 A1 | 10/2008 |
| GB | 706681 | 4/1954 |
| GB | 2110248 A | 6/1983 |
| JP | 60-002634 A | 1/1985 |
| JP | 60-169525 A | 9/1985 |
| JP | 02-258933 A | 10/1990 |
| JP | 02277724 A | 11/1990 |
| JP | 03-047924 A | 2/1991 |
| JP | 6-136451 A | 5/1994 |
| JP | 2002285311 A | 10/2002 |
| SU | 863681 A1 | 9/1981 |
| WO | 2005/68676 A1 | 7/2005 |
| WO | 2006128821 A1 | 12/2006 |
| WO | 2007048883 A1 | 5/2007 |
| WO | 2007-086158 A1 | 8/2007 |

(Continued)

OTHER PUBLICATIONS

Bian et al. "Development of Hot Dip Galvanized Steel Strip and its Application in Automobile Industry", Journal of Iron and Steel Research Int. vol. 13, No. 1, May 1, 2006.

(Continued)

*Primary Examiner* — Deborah Yee
(74) *Attorney, Agent, or Firm* — Novak Druce Connolly Bove + Quigg LLP

(57) ABSTRACT

A method of thermomechanical shaping a final product with very high strength including the steps of: providing a coated hot-rolled and/or cold-rolled steel strip or sheet including (all percentages in wt. %): 0.04%<carbon<0.5%, 0.5%<manganese<3.5%, silicon<1.0%, 0.01%<chromium<1%, titanium<0.2%, aluminum<0.2%, phosphorus<0.1%, nitrogen<0.015% N, sulphur<0.05%, boron<0.015%, unavoidable impurities, balance iron, the steel being coated with a zinc alloy coating layer, wherein the zinc alloy consists of 0.3-4.0% Mg and 0.05-6.0% Al; optionally at most 0.2% of one or more additional elements; unavoidable impurities; the remainder being zinc; cutting the steel sheet to obtain a steel sheet blank; thermomechanical shaping of the steel sheet blank to a final product with its final properties.

17 Claims, No Drawings

(56) References Cited

FOREIGN PATENT DOCUMENTS

| WO | 2008068352 A3 | 6/2008 |
|----|---------------|--------|
| WO | 2008113426 A2 | 9/2008 |
| WO | 2009021743 A1 | 2/2009 |

OTHER PUBLICATIONS

Lenze et al., "Herstellung von Karosseriebauteilen aus warmumgeformten h chfesten Stahlwerkstoffe", EFB Tagungsband, Europaeische Forschungesellschaft Fuer Blechverarbeitung, DE. vol. 25, Jan. 1, 2005.

Lenze et al., "Herstellung von Karosseriebauteilen aus warmumgeformten hochfesten Stahlwerkstoffe", EFB Tagungsband, Europaeische Forschungesellschaft Fuer Blechverarbeitung, DE. vol. 25, Jan. 1, 2005 with English language Abstract.

"High-Tech Tandem Cold Mills Cold rolling technology for all requirements", SMS Siemag, pp. 1-36 (2010 or later).

European Standard, Final Draft prEN 10336, "Continuously hot-dip coated and electrolytically coated strip and sheet of multiphase steels for cold forming—Technical delivery condition", pp. 1-25 (Dec. 2006).

www.asmet.at/forum2006, Forum fur Metallurgie and Werkstofftechnik (Forum for Metallurgy and Materials Engineering), Tagungsunterlagen (Meeting Documents), Leoben (May 22-24, 2006)(with Machine Translation).

European Standard, DEN EN 10027-1, "Designation systems for steels", Aug. 2005, pp. 1-25.

3d Party Observations of Jul. 31, 2012, against EP patent app. No. 08785556.5 to Tata Steel IJmuiden BV.

EPO Communication of Jan. 3, 2013, against EP patent app. No. 08785556.5 to Tata Steel IJmuiden BV.

Mubea—The Technology Company, website printout, retrieved from Internet Jun. 10, 2009 URL: http:/www.mubea.com/english/produkte_Kaross.html.

Non-Final Office Action dated Oct. 3, 2012 to Wu from U.S. Appl. No. 12/668,855, filed Jun. 22, 2010.

Pradhan, R., "Continuous Annealing of Steel", ASM Handbook, 1991, ASM International, vol. 4.,1-27.

Non-Final Office Action dated Nov. 21, 2012 from U.S. Appl. No. 12/669,314 to van Tol filed Jul. 19, 2010.

Non-Final Office Action dated Nov. 20, 2012 to Wu from U.S. Appl No. 12/668,791, filed Jun. 28, 2010.

Translation of JP 600002634 to Wachi, 1985.

Translation of JP 60169525 to Tauchi et al, 1985.

Apr. 11, 2013 Office Action, U.S. Appl. No. 12/669,314 to Ron Van Tol et al, filed Jul. 19, 2010.

Final Office action of Mar. 15, 2013 from U.S. Appl. No. 12/668,791 to Wu et al filed Jun. 28, 2010.

METHOD OF THERMOMECHANICAL SHAPING A FINAL PRODUCT WITH VERY HIGH STRENGTH AND A PRODUCT PRODUCED THEREBY

This is a §371 National Stage Application of International Application No. PCT/EP2008/052213, filed on 22 Feb. 2008, claiming the priority of European Patent Application No. 07003812.0 filed on 23 Feb. 2007 and European Patent Application No. 07004332.8 filed 2 Mar. 2007.

The invention relates to a method of thermomechanical shaping a final product with very high strength and a product produced thereby.

In many of the known high strength steel solutions the strength increase is accompanied with a decrease in formability. Steels like TRIP-steels, dual phase steels and even TWIP-steels seek to increase the strength of the steel by a carefully tuned combination of chemical composition and processing. Many of these steels have problems with weldability. The chemical composition of the steels may be such that weldability is impaired, or the welding may destroy the carefully produced microstructure as a result of the heat input during welding. This means that a produced part, which is welded to another part may be strong in general, but weak at the location of the welds. Moreover, the aforementioned steels all suffer from springback after shaping, and increasingly so with increasing yield strength.

By separating the forming properties and those required for use at least some of these problems may be overcome. The characteristics required for use are obtained through a thermomechanical shaping treatment of a steel part. By thermomechanical shaping treatment, a treatment is meant in which shaping and thermal treatment are integrated either by a shaping operation followed by a thermal treatment, or by a shaping operation during a thermal treatment. Coating the part for corrosion protection is usually performed on finished parts, which requires a careful cleaning of the surfaces and any hollow portions. In addition, the thermomechanical treatment must be performed under a controlled atmosphere in order to prevent any decarbonisation and/or oxidation of the metal in the sheet. Steel sheets that do not have any pre-coating require a post-treatment of the surface such as descaling and/or coating. If the coating is applied on the finished part, the surfaces and hollow areas of the part have to be very carefully cleaned. Said cleaning may require the use of acids or bases, whose recycling and storage entail significant financial costs and risks for the operators and the environment. Post-coating of steels with very high mechanical properties may also cause hydrogen induced cracking in electrogalvanizing or change in the mechanical properties of the steels in bath galvanizing of previously formed parts.

For that reason, pre-coated steels suitable for a thermomechanical shaping treatment have been proposed. The problem with these coated steels is that the adhesion of the coating to the steel substrate is insufficient and peels off before, during or after the thermomechanical shaping treatment. Another problem with a zinc alloy coating deposited on a metallic surface was considered heretofore as likely to melt, flow and foul the hot forming tools during the heat treatment at temperatures in excess of the zinc melting temperature. This would mean that the quality of the shaped product is likely to deteriorate, both in form and surface quality, over the course of a production series, or that the forming tools have to be cleaned often to prevent this deterioration. Furthermore, in the heat forming process, carbon build-up may damage the forming tools because of its abrasiveness, which diminishes the dimensional and aesthetic quality of the parts produced or requires frequent and costly tool repairs.

The object of this invention is to provide a method for producing a pre-coated hot- or cold-rolled steel strip or sheet of a desired thickness having excellent formability and which, after thermomechanical shaping treatment performed on the finished strip or sheet, makes it possible to obtain a yield strength in excess of 1000 MPa, a substantial resistance to shocks, fatigue, abrasion and wear, while retaining a good resistance to corrosion as well as a good capacity for painting, gluing and phosphating wherein the coating shows excellent adherence to the steel substrate and covering properties of the substrate prior to, during and after the thermomechanical shaping treatment, thereby conveying excellent protection against corrosion at all times.

It is also an object of the invention to provide a coated steel as described hereinabove which allows carrying out the mechanical part of the thermomechanical treatment at elevated temperatures, followed by hardening in the forming tool wherein the coating shows excellent adherence and covering properties prior to, during and after the thermomechanical treatment.

One or more of these objects are reached by providing a method of thermomechanical shaping a final product with very high strength comprising the steps of:

providing a coated hot-rolled and/or cold-rolled steel strip or sheet comprising (all percentages in wt. %):
  0.04%<carbon<0.5%
  0.5%<manganese<3.5%
  silicon<1.0%
  0.01%<chromium<1%
  titanium<0.2%
  aluminium<2.0%
  phosphorus<0.1%
  nitrogen<0.015% N
  sulphur<0.05%
  boron<0.015%
  unavoidable impurities,
  balance iron,
  the steel being coated with a zinc alloy coating layer, wherein the zinc alloy consists of 0.3-4.0% Mg and 0.05-6.0% Al; optionally at most 0.2% of one or more additional elements; unavoidable impurities; the remainder being zinc;

cutting the steel sheet to obtain a steel sheet blank;

thermomechanical shaping of the steel sheet blank to a final product with its final properties.

Preferably, the titanium content is larger than the amount required to stoichiometrically bind the nitrogen, so that Ti>3.4N. If all nitrogen is tied up to titanium, the nitrogen can no longer react with the boron. The minimum level of aluminium of 0.05% can be used, as it is not important to prevent all reactions between Fe and Zn. Without any aluminium, thick solid Fe—Zn alloys grow on the steel surface and the coating thickness cannot be regulated smoothly by wiping with a gas. An aluminium content of 0.05% is enough to prevent problematic Fe—Zn alloy formation. Preferably, the minimum aluminium content in the zinc alloy coating layer is at least 0.3%. Boron is mainly needed to suppress ferrite formation so as to allow martensite formation at lower critical cooling rates thereby limiting the risk of deformation of the formed products during cooling. If boron reacts to nitrogen, the resulting BN is no longer effective. Preferably, the amount of titanium is tailored to the nitrogen content so as not to add too much titanium, because it is a costly alloying element. Moreover, the excess titanium may react with carbon to form titaniumcarbide particles, and these hard particles may damage the forming tools or cause excessive wear to them. Preferably the maximum titanium content is therefore limited to Ti-3.4N<0.05%, but more preferably to Ti-3.4N<0.02%. Preferably, the total amount of additional elements in the zinc alloy is at most 0.2%. Chromium, manganese and carbon are added, in the composition of the steel according to the invention, for their effect on hardenability. In addition, carbon makes it possible to achieve high mechanical characteristics thanks to its effect on the hardness of the martensite. Aluminium is introduced into the composition in order to trap oxygen and to protect the effectiveness of the boron. Aluminium is also believed to prevent austenite grain growth. The steel in the sheet may undergo a treatment for globularization of sulphides performed with calcium, which has the effect of improving the fatigue resistance of the sheet. Phosphorus is preferably <0.05%.

The zinc alloy coating may be applied in a hot dip galvanizing line, and may be combined with a continuous recrystallisation or recovery annealing step. In an embodiment of the invention the thermomechanical shaping operation is a press forming operation.

The coated steel strip according to the invention provides excellent corrosion properties. Moreover, the magnesium containing zinc alloy coating layer provides lubrication during the thermomechanical shaping step, and the adhesion of the coating layer prior, during and after the thermomechanical shaping treatment is good. In addition, the elements of the zinc alloy coating layer diffused into the steel substrate during the prolonged exposure to heat when the coated steel material was heated prior to hot forming, thereby resulting in a diffusion coating, whilst the magnesium and aluminium are oxidised. This diffusion coating already provides the steel substrate with corrosion protection, whereas it is also believed to promote the adhesion of the zinc alloy coating layer to the steel substrate. The thickness of the Zn-diffusion layer should be chosen such that active corrosion protection after the forming and cooling step is achieved.

Mg-containing zinc layers are generally believed to be harder than non-Mg-containing zinc layers. Despite the fact that this generally means that the layers are more brittle, the inventors found that the adhesion of the zinc alloy coating layer was so much better that even during the high contact pressure during shaping the zinc alloy coating layer does not succumb to the pressure and remains in place to protect the product against corrosion during and after shaping. This may be because Mg addition are believed to be beneficial in promoting lubrication between the coated steel and the (hot) shaping tools. The inventors believe that the Mg-oxide forming on the zinc-layer protects against evaporation of the zinc. Reduced zinc evaporation is also beneficial in the snout area during hot dip galvanising. The snout is the location where the strip enters the zinc bath. Normally, zinc evaporates and forms dust at colder areas (zinc and zinc oxide) that may fall on the strip and zinc bath surface in the snout. This can lead to defects in the zinc coating. Mg oxide on the bath surface limits the evaporation of zinc in this area and so the decreases the chance on defects in the zinc coating. Lastly, the phosphatability of the steel is improved as a result of the addition of Mg.

Due to the formation of $Fe_2Al_5$, the coating layer always contains some iron, even though the bath from which the coating layer was deposited does not contain iron as an additional element as defined above. The iron constitutes an unavoidable impurity because of the fact that a steel substrate is used. The iron is not an additional element and should preferably not exceed 1.5% or more preferably 1.0%. In an embodiment of the invention the iron content in the coating layer is limited to below 0.6%, preferably to below 0.4%. Even more preferably the amount is limited to below 0.2%.

The inventors have found that the steels according to the invention provides an excellent substrate wettability for the zinc alloy coating layer according to the invention, excellent adhesion during the thermomechanical shaping treatment, quick formation of an iron-zinc intermetallic layer when being subjected to high temperature, excellent crack closure of any cracks formed in the coating during forming, good resistance against abrasion during forming and providing good corrosion resistance prior to, during and after the thermomechanical operation, including protection of the edges of the part due to the galvanic behaviour of zinc with steel. Thus, a combination of steel substrate having the desired mechanical properties with excellent corrosion protection is obtained. The aluminium content is limited to 6%, because above 6% the weldability is impaired.

An additional element that could be added in a small amount, less than 0.2 weight %, could be Pb or Sb, Ti, Ca, Mn, Sn, La, Ce, Cr, Ni, Zr or Bi, Pb, Sn, Bi and Sb are usually added to form spangles. These small amounts of an additional element do not alter the properties of the coating nor the bath to any significant extent for the usual applications. Preferably, when one or more additional elements are present in the zinc alloy coating, each is present in an amount <0.02 weight %, preferably each is present in an amount <0.01 weight %. This is because additional elements do not change the corrosion resistance to a significant extent as compared to the addition of magnesium and aluminium, and additional elements make the coated steel strip more costly. Additional elements are usually only added to prevent dross forming in the bath with molten zinc alloy for the hot dip galvanising, or to form spangles in the coating layer. The additional elements are thus kept as low as possible. The amount of zinc alloy on one side of the steel strip should be between 25 and 600 $g/m^2$. This corresponds to a thickness of between about 4 and 95 μm. Preferably the thickness is between 4 and 20 μm (50-140 $g/m^2$) because thicker coatings are not necessary for most applications. The zinc alloy coating layer according to the invention improves the protection against corrosion at a thickness of at most 12 μm. A thinner coating layer is beneficial for welding together two sheets of steel with the coating layer according to the invention, for instance by laser welding. In a preferred embodiment, the zinc alloy coating layer has a thickness of 3-10 μm, this being a preferred thickness range for automotive applications. According to a further preferred embodiment, the zinc alloy coating layer has a thickness of 3-8 μm or even 7 μm. This thickness is preferred when improved laser welds which are produced without a spacer are of importance.

In an embodiment of the invention the coated steel comprises the following composition (all percentages in wt. %):
  0.15%<carbon<0.5%
  0.5%<manganese<3%
  0.1%<silicon<0.5%
  0.01%<chromium<1%
  titanium<0.2%
  aluminium<0.1%
  phosphorus<0.1%
  nitrogen<0.01% N
  sulphur<0.05%
  0.0005%<boron<0.015%
  unavoidable impurities,
  balance iron.

In an embodiment of the invention, the steel substrate consists only of the alloying elements that are expressly claimed. Other elements, such as oxygen or rare earth elements, may only be present as unavoidable impurities, and the balance is iron.

In order to further improve the quality of the zinc alloy coating a galvannealing step after the zinc alloy coating step and prior to the cooling step to ambient temperature can be used. A galvannealing step may comprise the heating of the strip for instance for 20 to 40 seconds at 470 to 550° C., immediately following the hot dipping so as to achieve an iron content in the zinc alloy coating of up to 15%, preferably between 7 and 13%, for instance about 10%.

In an embodiment of the invention the thermomechanical shaping comprises shaping the steel sheet blank into a product at ambient temperature, subjecting said product to a thermal treatment by heating the product to above Ac1 so as to at least partially austenitise the product, followed by rapid cooling the product so as to obtain the final product with its final properties. The rapid cooling preferably is performed while the product is constrained, e.g. in the forming tools or heating tools to avoid shape defects or buckling to occur during the cooling. Optionally any excess material is trimmed after forming the product and prior to thermal treatment. Alternatively or additionally trimming of the final product, i.e. after the thermal treatment, may be performed, e.g by laser cutting. The trimming may also be performed while the product is being heat-treated or cooled.

This embodiment provides for the situation wherein the mechanical treatment is separate from the thermal treatment, i.e. the shaping step is performed at ambient temperature, and the thermal treatment is performed after the shaping step to give the product its final properties. The steel sheet is cut to obtain a steel sheet blank, the steel sheet blank is shaped to obtain the product, the part thus obtained is then heated to a temperature above Ac1 so as to at least partially austenitise the blank, and rapidly cooled, preferably at a cooling rate higher than the critical cooling rate and preferably in the press, to impart the product with high mechanical properties.

This embodiment also relates to a process for producing a product starting from the coated sheet in which, after shaping, the coating of the product is subjected to an increase in temperature at a speed in excess of 5° C./s, which may exceed 600° C./s. In another embodiment of the invention the thermomechanical shaping comprises heating the steel sheet blank to a temperature above Ac1, such as to a temperature in excess of 750° C., so as to at least partially austenitise the blank, shaping the blank into a product at elevated temperature and rapid cooling the product so as to obtain the final product with its final properties.

In this embodiment the steel sheet is cut to obtain a steel sheet blank, the steel sheet is heated to a temperature above Ac1 so as to at least partially austenitise the blank, the steel sheet blank is shaped to obtain the product, the part thus obtained is then rapidly cooled, preferably a rate higher than the critical cooling rate, to impart it with high mechanical properties. Trimming excess material and cooling of the product are as described above. In a preferred embodiment, the trimming operation is integrated with the forming operation in that trimming means are provided in the forming tools so as to trim the product immediately after forming the product in the press.

In yet another embodiment of the invention the thermomechanical shaping comprises shaping the steel sheet blank into a precursor product at ambient temperature, subjecting said precursor product to a thermal treatment by heating it to above Ac1 so as to at least partially austenitise the precursor product, shaping the precursor product into a product at elevated temperature and rapid cooling the product so as to obtain the final product with its final properties. This way, significantly higher degrees of deformation can be achieved because the stress of the precursor deformation will be relieved substantially or even completely prior to the second deformation at elevated temperature. In a preferred embodiment, the trimming operation is integrated with the forming operation in that trimming means are provided in the forming tools so as to trim the product immediately after forming the product in the press.

So the steel according to the invention is used in one of three types of thermomechanical shaping operations starting from a blank produced from a strip or sheet:

A) shaping the blank into a product, subjecting said product to a thermal treatment by heating it to above Ac1 so as to at least partially austenitise it, followed by rapid cooling it so as to obtain the final product with its final properties: this is sometimes referred to as cold-forming.

B) heating the blank to a temperature above Ac1 so as to at least partially austenitise the blank, shaping the blank into a product at elevated temperature, followed by rapid cooling it so as to obtain the final product with its final properties: this is sometimes referred to as hot-forming;

C) shaping the blank into a precursor product, subjecting said precursor product to a thermal treatment by heating it to above Ac1 so as to at least partially austenitise it, shaping the precursor product into a product at elevated temperature, followed by rapid cooling it so as to obtain the final product with its final properties: this can be referred to as cold-forming followed by hot forming;

In all cases the rapid cooling is preferably effected at a cooling rate higher than the critical cooling rate, to impart it with high mechanical properties. The resulting final product shows no springback, because the stresses induced by the forming step have been eliminated by the heat treatment. The cooling is preferably performed while the product is still in the forming press.

In all cases the treatment of the steel comprises a heating step to a temperature of at least the temperature where the steel starts to transform to austenite (Ac1). The reheating temperature depends on the desired degree of austenitisation, full austenitisation being achieved above Ac3. The upper temperature is limited by the grain growth at high temperatures and evaporation of the coating layer. Consequently a suitable maximum reheating temperature is Ac3+50° C. or even Ac3+20° C. The reheating time depends on the temperature to be reached and the thickness of the material, a thicker material needing more time to attain a homogeneous temperature throughout. The composition of the steel is optimized so as to limit the enlargement of the grains at the time of thermal treatment. If the desired microstructure after cooling is completely martensitic, the reheating temperature should be in excess of Ac3. These temperatures Ac1 and Ac3 can be easily determined in a dilatometer. For a completely martensitic structure and for a steel having the composition of the example, the speed of cooling should be in excess of the critical speed of hardening which is about 30° C./s for an austenitizing at 950° C. for 5 minutes, the sheet having a thickness of approximately 1.5 mm. The critical cooling rate can also be determined using a dilatometer, such as a Bähr 805 A/D.

It is possible to obtain ferrite-bainite or ferrite-martensite structures in any of the processes A, B or C by heating to a temperature between Ac1 and Ac3 followed by an appropriate cooling. According to the level of resistance to be achieved and the thermal treatment applied, one or several of these phases is/are present in appropriate proportions in the final microstructure. The choice of annealing temperature determines the austenite fraction during annealing. In combination with the composition and the cooling rate, the desired microstructure after cooling can be obtained. For the highest strength levels, the final microstructure is composed predominantly or even completely of martensite. Some retained austenite may be present in the final microstructure after cooling. Metallographical studies after a thermal or thermomechanical treatment in a dilatometer enables determining the correct process parameters for a given chemical composition of the steel.

In an embodiment of the invention the zinc alloy comprises 0.3-2.3 weight % magnesium and 0.05-2.3 weight % aluminium. By limiting the magnesium level to at most 2.3% the formation of oxidic dross on the zinc bath is reduced whilst retaining the corrosion protection at a sufficiently high level. By limiting the aluminium content, the weldability is improved. Preferably aluminium is 0.6-2.3 weight %. In a preferred embodiment, the silicon content in the zinc alloy layer is below 0.0010 weight %. In an embodiment of the invention, the zinc alloy comprises 0.3-4.0 weight % magnesium and 0.05-1.6 weight % aluminium. Preferably aluminium is 0.3-2.3 weight %.

According to a preferred embodiment, the steel strip has been provided with a zinc alloy coating layer in which the zinc alloy contains 1.6-2.3 weight % magnesium and 1.6-2.3 weight % aluminium. This is a preferred embodiment, because at these values the corrosion protection of the coating is at a maximum, and the corrosion protection is not influenced by small compositional variations. Above 2.3 weight % magnesium and aluminium, the coating becomes rather expensive and coating may become brittle and the surface quality of the coating may decrease.

In an embodiment of the invention the steel strip has been provided with a zinc alloy coating layer in which the zinc alloy contains 0.05-1.3 weight % aluminium and/or 0.3-1.3 weight % magnesium. Preferably aluminium is 0.6-2.3 weight %. With these smaller amounts of aluminium and magnesium, no major modifications of the conventional hot dipped galvanising bath and apparatus are needed, whereas magnesium at levels between 0.3 and 1.3 weight % improves the corrosion resistance considerably. Usually, for these amounts of magnesium more than 0.5 weight % of aluminium has to be added to prevent that more oxidic dross is formed on the bath than for conventional baths; dross can lead to defects in the coating. The coatings with these amounts of magnesium and aluminium are optimal for applications with high demands on surface quality and improved corrosion resistance.

Preferably, the zinc alloy contains 0.8-1.2 weight % aluminium and/or 0.8-1.2 weight % magnesium. These amounts of magnesium and aluminium are optimal to provide a coating with both a high corrosion resistance, an excellent surface quality, an excellent formability, and a good weldability at limited extra costs as compared to conventional hot dipped galvanising.

According to a preferred embodiment, the steel strip has been provided with a hot dip galvanized zinc alloy coating layer in which the amount of aluminium in weight % is the same as the amount of magnesium in weight % plus or minus a maximum of 0.3 weight %. It has been found that the dross formed on the bath is suppressed to a considerable level when the amount of aluminium equals or almost equals the amount of magnesium.

In an embodiment of the invention the coated steel substrate comprises:
0.15%<carbon<0.40%
0.8%<manganese<1.5%
0.1%<silicon<0.35%
0.01%<chromium<1%
titanium<0.1%
aluminum<0.1%
nitrogen<0.01% N
phosphorus<0.05%
sulphur<0.03%
0.0005%<boron<0.01%,
unavoidable impurities,
balance iron,
wherein Ti>3.4N.

In a preferred embodiment the coated steel substrate comprises:
0.15-0.25% C
1.0-1.5% Mn
0.1-0.35% Si
max 0.8% Cr, preferably 0.1-0.4% Cr
max 0.1% Al
0-0.05% Nb, preferably max. 0.03%
0-0.01% N
0.01-0.07% Ti
phosphorus<0.05%, preferably <0.03%
sulfur<0.03%
0.0005%<boron<0.008%,
unavoidable impurities,
balance iron,
wherein Ti>3.4N.

Preferably B is at least 0.0015%. It was found that the effect of boron became particularly evident when the boron content was at least 15 ppm.

In a preferred embodiment the coated steel substrate comprises:
0.15-0.25% C
1.0-1.5% Mn
0.1-0.35% Si
max 0.8% Cr, preferably 0.1-0.4% Cr
max 0.1% Al
0-0.05% Nb, preferably max. 0.03%
0-0.01% N
0.0015-0.008% B
0.01-0.07% Ti wherein Ti>3.4N
unavoidable impurities
balance iron The invention also concerns the use of the coated hot-rolled and/or cold-rolled steel, for producing structural and/or anti-intrusion or substructure parts for a land motor vehicle, such as, for example, a bumper beam of a car, a door reinforcement or a B-pillar reinforcement.

The strip or sheet according to the invention is preferably produced by hot rolling a continuously thick or thin cast slab, usually having a thickness of between 300 and 50 mm. It may also be produced by strip casting to a thickness of between 1 and 20 mm, optionally followed by one or more hot rolling passes. This hot-rolled precursor material may be coated and used according to the invention, but it may also be cold rolled depending on the final thickness desired. After cold rolling it then is coated with the coating according to the invention. The coating step may be preceded by an annealing step in order to change the deformed microstructure of the cold-rolled strip by recovery or recrystallisation, so as to make it more formable. The strip or sheet can subsequently be used in the thermomechanical shaping step.

The coating has in particular the function of protecting the basic sheet against hot as well as cold corrosion. The mechanical characteristics in the delivery state of the sheet according to the invention allow a great variety of shaping, in particular a deep stamping. The thermal treatment applied at the time of a hot-shaping process or after shaping makes it possible to obtain high strength values which may exceed 1500 MPa tensile strength and 1200 MPa for the yield strength. The final mechanical properties are adjustable and depend on the chemical composition, particularly the carbon content, of the steel and on the thermal treatment thereof.

By way of example, a calcium treated steel sheet according to the invention containing 0.21% carbon, 1.27% manganese, 0.012% phosphorus, 0.001% sulfur, 0.18% silicon, 0.031% aluminium, 0.014% copper, 0.020% nickel, 0.18% chromium, 0.0050% nitrogen, 0.018% titanium, 0.002% boron is coated with a zinc alloy coating layer according to the invention.

According to the invention the sheet, which may have a thickness of between 0.25 mm and 15 mm, and preferably between 0.3 and 5 mm, and which may be supplied on a coil or as sheets, has good shaping properties and a good resistance to corrosion as well as a good capacity for painting, gluing or phosphating.

The sheet, a coated steel product, provides a good resistance to corrosion in the as-supplied state, during thermomechanical shaping treatments as well as during usage of the finished formed product. After thermal treatment, a substantial tensile strength, which may exceed 1200 MPa or even higher, is obtained.

The invention claimed is:

1. Method of thermomechanical shaping a final product with very high strength comprising the steps of:
   providing a coated hot-rolled and/or cold-rolled steel strip or sheet comprising (all percentages in wt. %):
   0.04%<carbon<0.5%
   0.5%<manganese<3.5%
   silicon<1.0%
   0.01%<chromium<1%
   titanium<0.2%
   aluminium<2.0%
   phosphorus<0.1%
   nitrogen<0.015%
   sulphur<0.05%
   boron<0.015%
   unavoidable impurities,
   balance iron,
      the steel being coated with a zinc alloy coating layer, wherein the zinc alloy consists of 1.6-2.3% Mg and 1.6-2.3% Al; optionally at most 0.2% of one or more additional elements; unavoidable impurities; the remainder being zinc;
   cutting the coated steel strip or sheet to obtain a steel sheet blank;
   thermomechanical shaping of the steel sheet blank to a final product with its final properties;
   wherein the thermomechanical shaping comprises
   heating the blank to a temperature above Ac1 to at least partially austenitise the blank, shaping the blank into a product at elevated temperature and rapid cooling the product to obtain the final product with its final properties.

2. Method according to claim 1, wherein the steel comprises:
   0.15%<carbon<0.5%
   0.5%<manganese<3%
   0.1%<silicon<0.5%
   0.01%<chromium<1%
   titanium<0.2%
   aluminium<0.1%
   phosphorus<0.1%
   nitrogen 0-0.01%
   sulphur<0.05%
   0.0005%<boron<0.015%
   unavoidable impurities,
   balance iron.

3. Method according to claim 1, wherein the coated hot-rolled and/or cold-rolled steel strip or sheet consists of (all percentages in wt. %):
   0.15%<carbon<0.5%
   0.5%<manganese<3.5%
   silicon<1.0%
   0.01%<chromium<1%
   titanium<0.2%
   aluminium<2.0%
   phosphorus<0.1%
   nitrogen<0.015%
   sulphur<0.05%
   boron<0.015%
   Nb<0.05%
   unavoidable impurities,
   balance iron,
      the steel being coated with a zinc alloy coating layer, wherein the zinc alloy consists of 1.6-2.3% Mg and 1.6-2.3% Al; optionally at most 0.2% of one or more additional elements; unavoidable impurities; the remainder being zinc.

4. Method according to claim 1, wherein the steel comprises:
   0.15%<carbon<0.40%
   0.8%<manganese<1.5%
   0.1%<silicon<0.35%
   0.01%<chromium<1%
   nitrogen 0-0.01%
   titanium<0.1
   aluminium<0.1%
   phosphorus<0.05%
   sulphur<0.03%
   0.0005%<boron<0.01%,
   unavoidable impurities,
   balance iron,
   wherein Ti>3.4N.

5. Method according to claim 1, wherein the steel comprises:
   0.15-0.25% C
   1.0-1.5% Mn
   0.1-0.35% Si
   max 0.8% Cr
   max 0.1% Al
   0-0.05% Nb
   0-0.01% N
   0.01-0.07% Ti
   phosphorus<0.05%
   sulphur<0.03%
   0.0005%<boron<0.008%
   unavoidable impurities,
   balance iron.

6. Method according to claim 1, wherein the steel comprises at least 0.0015% B.

7. Method according to claim 1, wherein the steel comprises:
   0.15-0.25% C
   1.0-1.5% Mn
   0.1-0.35% Si max 0.8% Cr
max 0.1% Al
0-0.05% Nb
0-0.01% N
0.0015-0.008% B
0.01-0.07% Ti wherein Ti>3.4N
unavoidable impurities
balance iron.

8. Method according to claim 1, wherein the steel comprises Ti-3.4N<0.05%.

9. Method according to claim 1, wherein the final product is an automotive part.

10. Structural and/or anti-intrusion or substructure parts for a land motor vehicle selected from the group consisting of a bumper beam of a car, a door reinforcement or a B-pillar reinforcement produced according to claim 1.

11. Method according to claim 1, wherein the steel comprises Ti-3.4N<0.02%.

12. Method according to claim 1, wherein the steel includes nitrogen 0.005-0.015%.

13. Method according to claim 1, wherein the amount of aluminum in wt. % is the same as the amount of magnesium in wt. % plus or minus a maximum of 0.3 wt. %.

14. Method according to claim 1, further comprising galvannealing the zinc alloy coating prior to said shaping to achieve an iron content in the zinc alloy coating of between 7 and 15 wt. %.

15. The method of claim 1, wherein the coated hot-rolled and/or cold-rolled steel strip or sheet comprises (all percentages in wt. %):
0.15%<carbon<0.5%
0.5%<manganese<3.5%
silicon<1.0%
0.01%<chromium<1%
titanium 0.01-0.2%, wherein Ti>3.4N
aluminium<2.0%
phosphorus<0.1%
nitrogen 0.005-0.015%
sulphur<0.05%
boron 0.0005%-0.015%
Nb<0.05%
unavoidable impurities,
balance iron.

16. Method according to claim 15, wherein the steel comprises 0.0015%<boron<0.015% and 0.01-0.07% Ti and 0.012-<0.1% P, wherein the steel comprises Ti-3.4N<0.05%.

17. Method according to claim 16, wherein the steel comprises Ti-3.4N<0.02%.

* * * * *